(12) United States Patent
Yang et al.

(10) Patent No.: US 9,956,893 B2
(45) Date of Patent: May 1, 2018

(54) SAFETY SEAT (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Haisheng Wang, Beijing (CN); Xiaochuan Chen, Beijing (CN); Weijie Zhao, Beijing (CN); Yingming Liu, Beijing (CN); Xiaoliang Ding, Beijing (CN); Rui Xu, Beijing (CN); Lei Wang, Beijing (CN); Changfeng Li, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 0 days. days.

(21) Appl. No.: 15/309,104

(22) PCT Filed: Nov. 6, 2015

(86) PCT No.: PCT/CN2015/093956
§ 371 (c)(1),
(2) Date: Nov. 4, 2016

(87) PCT Pub. No.: WO2016/206277
PCT Pub. Date: Dec. 29, 2016

(65) Prior Publication Data
US 2017/0158085 A1 Jun. 8, 2017

(30) Foreign Application Priority Data
Jun. 23, 2015 (CN) .......................... 2015 1 0349479

(51) Int. Cl.
G06F 7/00 (2006.01)
B60N 2/02 (2006.01)
(Continued)

(52) U.S. Cl.
CPC ......... *B60N 2/0244* (2013.01); *B60N 2/5621* (2013.01); *B60N 2/643* (2013.01); *G08B 21/20* (2013.01); *B60N 2002/0268* (2013.01)

(58) Field of Classification Search
CPC .... B60N 2/0244; B60N 2/5621; B60N 2/643; G08B 21/20
(Continued)

(56) References Cited

U.S. PATENT DOCUMENTS 5,848,661 A 12/1998 Fu
6,293,584 B1 * 9/2001 Levine .................. B60K 23/02
280/735
(Continued)

FOREIGN PATENT DOCUMENTS

CN 2035513 U 4/1989
CN 2053468 U 2/1990
(Continued)

OTHER PUBLICATIONS

Chinese First Office Action for Chinese Application No. 201510349479.4, dated Nov. 30, 2016, 9 Pages.
(Continued)

*Primary Examiner* — Muhammad Shafi
(74) *Attorney, Agent, or Firm* — Brooks Kushman P.C.

(57) ABSTRACT

A safety seat is provided, including a seat base and a seat back. The seat back includes a framework adjustable in shape and a covering part covering the framework and made of flexible material. A surface of the covering part is provided with multiple sensors for obtaining back position information of a person sitting on the safety seat. The safety (Continued)

seat further includes a data processing device and a driving structure. The data processing device is for receiving the back position information, determine a shape of a back surface of the person and send a covering part adjustment signal. The driving structure is for adjusting a shape of the framework according to the covering part adjustment signal and changing a shape of the surface of the covering part by changing the shape of the framework so as to match the shape of the back surface of the person.

15 Claims, 6 Drawing Sheets

(51) Int. Cl.
  *B60N 2/64* (2006.01)
  *B60N 2/56* (2006.01)
  *G08B 21/20* (2006.01)
(58) Field of Classification Search
  USPC .................................................. 701/49
  See application file for complete search history.

(56) References Cited

U.S. PATENT DOCUMENTS

| | | | | |
|---|---|---|---|---|
| 6,393,348 B1* | 5/2002 | Ziegler | ................. | B60N 2/002 180/271 |
| 6,812,844 B1* | 11/2004 | Burgess | ................ | B60N 2/002 180/273 |
| 7,320,223 B1* | 1/2008 | Dabney | ................... | B60N 2/28 62/244 |
| 7,321,306 B2* | 1/2008 | Lee | ........................ | B60N 2/002 280/734 |
| 8,217,770 B2* | 7/2012 | Messner | ................ | G08C 17/02 180/268 |
| 2003/0132838 A1* | 7/2003 | Toles | ................... | B60N 2/0244 340/457 |
| 2003/0158644 A1* | 8/2003 | Basson | ............ | G08B 13/19647 701/49 |

FOREIGN PATENT DOCUMENTS

| | | |
|---|---|---|
| CN | 1929761 A | 3/2007 |
| CN | 102456280 A | 5/2012 |
| CN | 202911595 U | 5/2013 |
| CN | 202932444 U | 5/2013 |
| CN | 103863165 A | 6/2014 |
| CN | 204363516 U | 6/2015 |
| CN | 104908616 A | 9/2015 |
| CN | 204687876 U | 10/2015 |
| JP | H08-308679 | * 11/1996 |
| JP | H08308679 A | 11/1996 |
| WO | 2014084283 A1 | 6/2014 |

OTHER PUBLICATIONS

International Search Report and Written Opinion for Application No. PCT/CN2015/093956, dated Mar. 29, 2016, 13 Pages.

* cited by examiner

SAFETY SEAT

CROSS-REFERENCE TO RELATED APPLICATIONS

This application is the U.S. national phase of PCT Application No. PCT/CN2015/093956 filed on Nov. 6, 2015 which claims priority to Chinese Patent Application No. 201510349479.4 filed on Jun. 23, 2015, the disclosures of which are incorporated in their entirety by reference herein.

TECHNICAL FIELD

The present disclosure relates to the technical field of intelligent articles of daily use, in particular to a safety seat.

BACKGROUND

More and more families own their private cars nowadays. After having their babies, young couples like to travel with the babies in their cars. Thus, safety seats are necessary for ensuring the safety of the babies during travels. Many developed countries even enact relevant laws to ensure that babies only are allowed to travel in cars provided with safety seats.

As for safety seats of cars in related techniques, no matter expensive or cheap, these safety seats merely have functions of adjusting a seat back angle and adjusting a headrest height so that they can be used by babies of different sizes and can meet the requirements of comfort degrees of different babies. Considering different body shapes of different babies, although the seat back angle can be adjusted, inherent shapes of surfaces of the seat backs may not be suitable for all the persons sitting on the safety seats. Therefore, the persons sitting on the safety seats may feel uncomfortable.

SUMMARY

Technical solution of the present disclosure provides a safety seat, which can automatically adjust the shape of a seat back according to the body contour of a person sitting on the safety seat, so as to make the person comfortable.

The present disclosure provides a safety seat, which includes a seat base and a seat back. The seat back includes a framework adjustable in shape and a covering part that covers an exterior of the framework and is made of a flexible material, and a surface of the covering part is provided with a plurality of sensors for sensing and obtaining back position information of a person sitting on the safety seat riding on the safety seat. The safety seat further includes a data processing device used for receiving the back position information obtained by the sensors, determining a shape of the back surface of the person sitting on the safety seat, and sending a covering part adjustment signal, and a driving structure used for adjusting a shape of the framework according to the covering part adjustment signal and changing a shape of the surface of the covering part by changing the shape of the framework. The changed shape of the surface of the covering part matches the shape of the back surface of the person sitting on the safety seat.

Optionally, in the above safety seat, the framework includes a plurality of support rods connected to each other, and adjacent support rods among the plurality of support rods are connected rotatable. The driving structure adjusts angles formed by the adjacent support rods according to the covering part adjustment signal to adjust the shape of the framework.

Optionally, in the above safety seat, the driving structure includes a driving motor and a plurality of connection rods, each of the plurality of connection rods is connected to the driving motor, and the plurality of support rods is connected to the plurality of connection rods in a one-to-one correspondence. The driving motor drives a corresponding connection rod to move according to the covering part adjustment signal, such that a support rod corresponding to the moved connection rod moves and the angles formed by the adjacent support rods change.

Optionally, in the above safety seat, the plurality of support rods includes support rods horizontally arranged in a plurality of rows and support rods vertically arranged in a plurality of columns, there is more than one support rod horizontally arranged in each row and there is more than one support rod vertically arranged in each column, the support rods that are horizontally arranged and the support rods that are vertically arranged intersect each other to form a grid, and the adjacent support rods are rotatably connected.

Optionally, in the above safety seat, the plurality of sensors is a plurality of pressure sensors configured to sense pressures applied on the covering part by a back of the person sitting on the safety seat and obtain pressure signals corresponding to the pressures, the data processing device specifically includes a first signal receiver used for collecting the pressure signals obtained by the plurality of pressure sensors, and a first analyzer used for determining the shape of the back surface of the person sitting on the safety seat according to pressure values of the pressure signals obtained by the plurality of pressure sensors.

Optionally, in the above safety seat, the data processing device further includes a second analyzer used for determining, according to the shape of the back surface of the person sitting on the safety seat that is determined by the first analyzer, a back contour region generated by the person sitting on the safety seat on the covering part; a third analyzer used for receiving a pressure signal detected by each pressure sensor within the back contour region on the covering part after the driving structure adjusts the shape of the framework according to the covering part adjustment signal, and determining whether a difference between the pressure value of the pressure signal sent by each pressure sensor within the back contour region on the covering part and a predetermined pressure value is within a preset range; and a first signal transmitter used for sending an adjustment stopping signal to the driving structure in the case that the third analyzer determines that the difference between the pressure value of the pressure signal sent by each pressure sensor within the back contour region on the covering part and the predetermined pressure value is within the preset range, and sending an adjustment continuation signal to the driving structure in the case that the third analyzer determines that the difference between the pressure value of the pressure signal sent by at least one pressure sensor within the back contour region on the covering part and the predetermined pressure value is not within the preset range.

Optionally, in the above safety seat, the plurality of sensors is a plurality of position sensors configured to sense perpendicular distances from the back surface of the person sitting on the safety seat to the surface of the covering part and obtain distance signals corresponding to the perpendicular distances, the data processing device specifically includes a second signal receiver used for collecting the distance signals obtained by the plurality of position sensors, and a fourth analyzer used for determining the shape of the back surface of the person sitting on the safety seat according to distance values of the distance signals obtained by the plurality of position sensors.

Optionally, in the above safety seat, the data processing device includes: a fifth analyzer used for determining, according to the shape of the back surface of the person sitting on the safety seat, a back contour region generated by the person sitting on the safety seat on the covering part; a sixth analyzer used for receiving a distance signal detected by each position sensor within the back contour region on the covering part after the driving structure adjusts the shape of the framework according to the covering part adjustment signal, and determining whether a difference between the distance value of the distance signal obtained by each position sensor within the back contour region on the covering part and a predetermined distance value is within a preset range; and a second signal transmitter used for sending an adjustment stopping signal to the driving structure in the case that the sixth analyzer determines that the difference between the distance value of the distance signal obtained by each position sensor within the back contour region on the covering part and the predetermined distance value is within the preset range, and sending an adjustment continuation signal to the driving structure in the case that the sixth analyzer determines that the difference between the distance value of the distance signal obtained by at least one position sensor within the back contour region on the covering part and the predetermined distance value is not within the preset range.

Optionally, in the above safety seat, vents are provided in the seat base, the vents extend to a surface of the seat base, and the seat base is further provided with an air-exhausting device connected to the vents.

Optionally, in the above safety seat, the surface of the seat base is provided with temperature sensors used for monitoring a surface temperature of the seat base, and the safety seat further includes a first controller used for initiating the air-exhausting device in the case that the temperature sensors detect that the surface temperature of the seat base is higher than a preset temperature.

Optionally, in the above safety seat, the surface of the seat base is provided with moisture sensors used for monitoring a surface moisture of the seat base, and the safety seat further includes a second controller used for initiating the air-exhausting device in the case that the moisture sensors detect that the surface moisture of the seat base is greater than a first preset moisture.

Optionally, the above safety seat further includes: an alarming device used for alarming by emitting a light or making a sound, and a third controller used for initiating the alarming device in the case that the moisture sensors detect that the surface moisture of the seat base is greater than a second preset temperature, where the second preset moisture is greater than the first preset moisture.

Optionally, the above safety seat further includes an information output system used for sending data that is calculated by the data processing device for representing the shape of the back surface of the person sitting on the safety seat to a display terminal, to display a simulated back state of the person sitting on the safety seat with an image on the display terminal.

Optionally, in the above safety seat, the base further is provided with a weight detector for detecting a weight of the person sitting on the safety seat and a voice player for reporting the weight of the person sitting on the safety seat.

Optionally, in the above safety seat, the driving structure includes a plurality of driving motors and a plurality of connection rods. The plurality of connection rods is connected to the plurality of driving motors in a one-to-one correspondence, the plurality of connection rods is connected to connection points of adjacent support rods in a one-to-one correspondence, and positions of the connection points between adjacent support rods has a one-to-one correspondence with positions of respective sensors. The plurality of driving motors drives a corresponding connection rod to move according to the covering part adjustment signal, such that a support rod corresponding to the moved connection rod moves and the angles formed by the adjacent support rods change.

The safety seat can detect and obtain the back position information of the person sitting on the safety seat through the sensors provided on the surface of the covering part to further determine the back shape and automatically adjust the shape of the covering part to match the shape of the back of the person sitting on the safety seat, thereby meeting the requirements on comfort of the person sitting on the safety seat.

DETAILED DESCRIPTION

In order to make technical solutions and advantages of the present disclosure more apparent, the present disclosure is described hereinafter in conjunction with drawings and embodiments.

A safety seat according to embodiments of the present disclosure includes a seat base and a seat back. The seat back includes a framework adjustable in shape and a covering part that covers the exterior of the framework and is made of a flexible material, and when the shape of the framework is changed, the shape of the covering part that covers the exterior of the framework is changed correspondingly. Multiple sensors are arranged on a surface of the covering part, for obtaining, through sensing, back position information of a person sitting on the safety seat. The safety seat further includes: a data processing device used for receiving the back position information obtained by each of the sensors, determining the shape of a back surface of the person sitting on the safety seat and sending a covering part adjustment signal and a driving structure used for adjusting the shape of the framework according to the covering part adjustment signal and changing the shape of a surface of the covering part by changing the shape of the framework, where the changed shape of the surface of the covering part matches the shape of the back surface of the person sitting on the safety seat.

The safety seat according to the embodiments of the present disclosure can detect and obtain the back position information of the person sitting on the safety seat through the sensors provided on the surface of the covering part, to further determine the shape of the back surface and automatically adjust the shape of the covering part to match the shape of the back surface of the person sitting on the safety seat, thereby meeting requirements on comfort of the person sitting on the safety seat.

Figure 1:
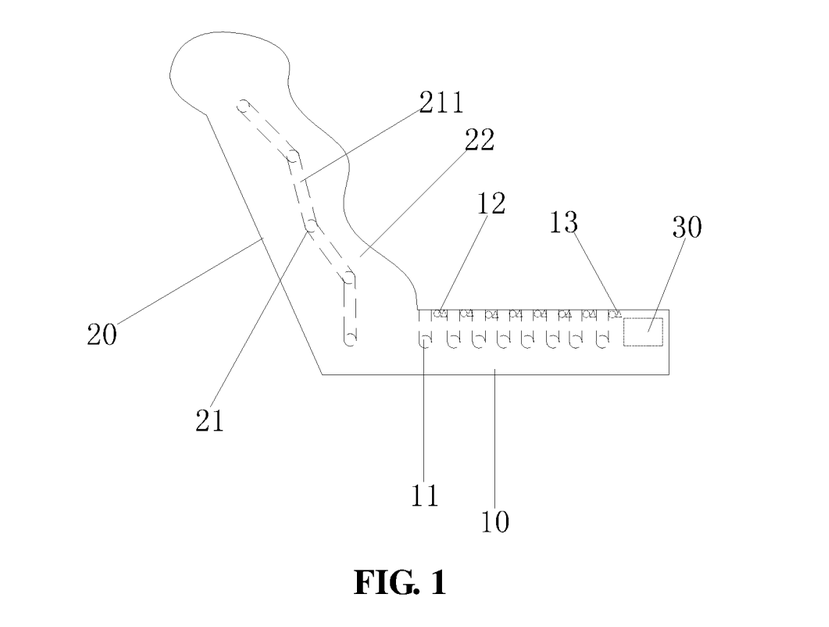
FIG. 1 is a schematic side view showing a structure of a safety seat according to some embodiments of the present disclosure.

FIG. 1 is a schematic side view showing a structure of a safety seat according to some embodiments of the present disclosure. As shown in FIG. 1, the safety seat includes a seat base 10 and a seat back 20, where the seat back 20 includes a framework 21 adjustable in shape and a covering part 22 covering the exterior of the framework and made of a flexible material. Multiple sensors are arranged on a surface of the covering part 22, for sensing and obtaining back position information of a person sitting on the safety seat.

In the embodiments of the present disclosure, as shown in FIG. 1, the framework 21 capable of adjusting the shape of the seat back 20 is formed by multiple support rods 211 connected to each other, and adjacent support rods are connected rotatably. In addition, all the support rods 211 are connected to a driving structure, and the shape of the framework is adjusted by adjusting angles formed by the adjacent support rods.

Figure 2:
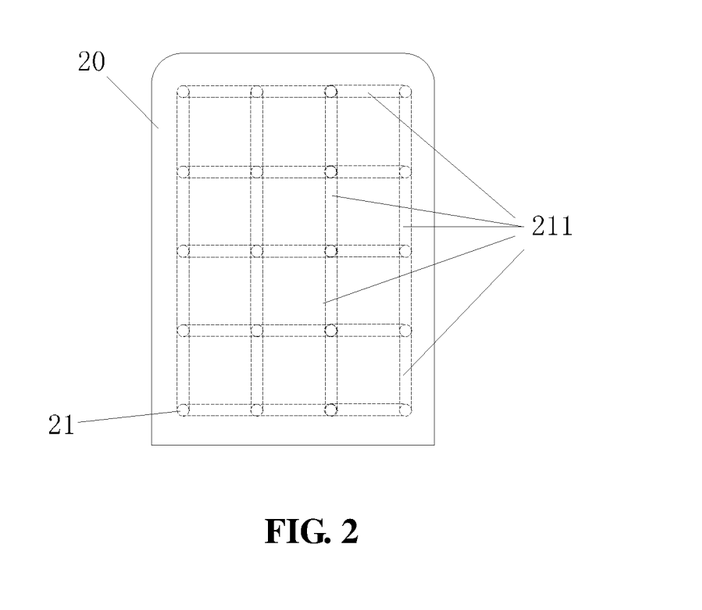
FIG. 2 is a schematic view showing a structure of a framework of a seat back of a safety seat according to some embodiments of the present disclosure.

Specifically, as shown in FIG. 2, the framework 21 is formed by multiple horizontally arranged first support rod groups and multiple vertically arranged second support rod groups, where each first support rod group includes multiple horizontally arranged support rods 211, and each second support rod group includes multiple vertically arranged support rods 211. The multiple horizontally arranged support rods 211 and the multiple vertically arranged support rods 211 intersect each other to form a grid, and any two adjacent support rods 211 are rotatably connected. By means of such a disposition manner, when there is a need to adjust the shape of the surface of the covering part 22, it merely needs to change the angles formed by adjacent support rods 211.

Figure 8:
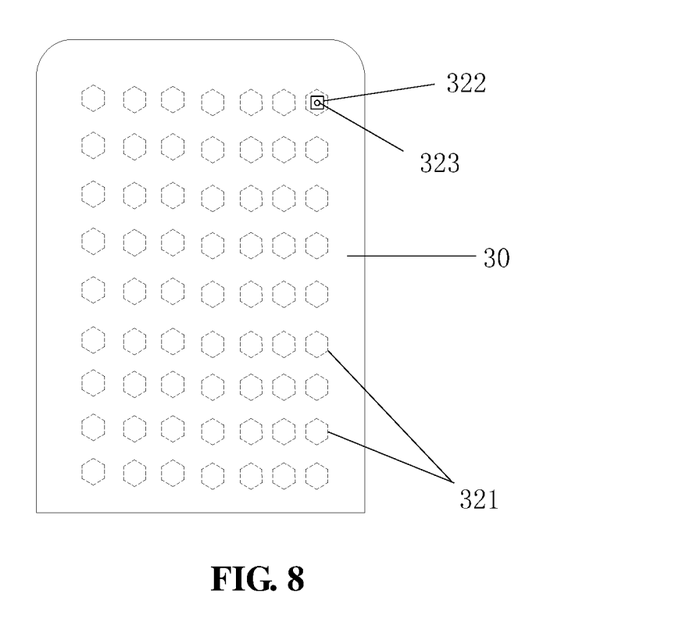
FIG. 8 is a top view of a seat back of a safety seat according to some embodiments of the present disclosure.

Specifically, the driving structure may include a driving motor. Each support rod 211 can be connected to the driving motor through one connection rod, and the driving motor drives the connection rod to move such that the support rod 211 corresponding to the connection rod moves accordingly and angles respectively formed by the moved support rod 211 and other support rods 211 connected to the moved support rod 211 are changed. In a safety seat according to an embodiment of the present disclosure, as shown in FIG. 8 which is a top view of a seat back of the safety seat, the driving structure includes multiple driving motors 322 arranged in an array, the seat back is provided with sensors 321 arranged in an array, each sensor 321 corresponds to one connection point of adjacent support rods and corresponds to one driving motor 322, each connection point of adjacent support rods is connected to the corresponding driving motor 322 through a corresponding connection rod 323. The driving structure drives one or more driving motors 322 to move the connection rod 323 corresponding to the one or more driving motors 322, such that the connection point of adjacent support rods corresponding to the moved connection rod 323 moves accordingly and the angles formed by the adjacent support rods are changed.

Surely, the above-described framework capable of changing the shape of the surface of the covering part 22 is just an example of the present disclosure, and the structure of the framework is not limited thereto.

Figure 3:
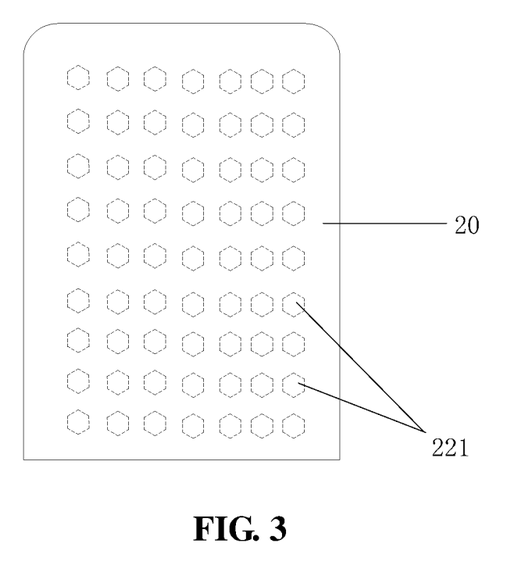
FIG. 3 is a schematic view showing a structure of pressure sensors of a seat back of a safety seat according to some embodiments of the present disclosure.

In a safety seat according to some embodiments of the present disclosure, the multiple sensors provided on the surface of the covering part 22 can be pressure sensors. A plane view of the surface of the covering part 22 is shown in FIG. 3. Multiple pressure sensors 221 are uniformly distributed on the surface of the covering part 22, for sensing pressures applied on the covering part 22 by a back of the person sitting on the safety seat and obtaining corresponding pressure signals. That is, pieces of back position information obtained by respective pressure sensors 221 include the pressure signals corresponding to the pressures applied on the covering part by the back of the person sitting on the safety seat.

The data processing device provided for the safety seat is used for receiving the back position information (i.e. the pressure signals) obtained by respective pressure sensors 221, determining the shape of the back surface of the person sitting on the safety seat, and sending a covering part adjustment signal.

The data processing device according to some embodiments of the present disclosure may include: a first signal receiver used for collecting the pressure signals sent by the respective pressure sensors 221, and a first analyzer used for determining the shape of the back surface of the person sitting on the safety seat according to pressure values of the pressure signals sent by the respective pressure sensors 221.

The first analyzer compares the pressure values of the pressure signals sent by the respective pressure sensors 221. When the pressure value of one pressure signal is relatively large, the first analyzer determines that a back position corresponding to the pressure sensor 221 that sends the pressure signal protrudes; therefore, such back position applies a relative large pressure on the covering part 22. When the pressure value of one pressure signal is relatively small, the first analyzer determines that a back position corresponding to the pressure sensor 221 that sends the pressure signal is sunken; therefore, such back position applies a relative small pressure on the covering part 22. Based on the above principle, the first analyzer can determine the shape of the back surface of the person sitting on the safety seat according to the pressure values of the pressure signals sent by the respective pressure sensors 221.

Further, the data processing device may include:

a second analyzer used for determining a back contour region generated by the person sitting on the safety seat on the covering part 22 according to the shape of the back surface of the person sitting on the safety seat that is determined by the first analyzer;

a third analyzer used for receiving a pressure signal detected by each pressure sensor 221 within the back contour region on the covering part 22 after the driving structure adjusts the shape of the framework 21 according to the covering part adjustment signal, and determining whether a difference between the pressure value of the pressure signal sent by each pressure sensor 221 and a predetermined pressure value is within a preset range; and a first signal transmitter used for sending an adjustment stopping signal to the driving structure in the case that the third analyzer determines that the difference between the pressure value of the pressure signal sent by each pressure sensor 221 within the back contour region on the covering part 22 and the predetermined pressure value is within the preset range, and sending an adjustment continuation signal to the driving structure in the case that the third analyzer determines that the difference between the pressure value of the pressure signal sent by at least one pressure sensor 221 within the back contour region on the covering part 22 and the predetermined pressure value is not within the preset range.

In the embodiments of the present disclosure, the data processing device uses the second analyzer to determine the back contour region (i.e. an abutting range on the covering part 22) of the person sitting on the safety seat on the covering part 22. After the driving structure adjusts the shape of the framework 21 according to the covering part adjustment signal, the third analyzer is used to determine whether the difference between the pressure value of the pressure signal detected by each pressure sensor 221 within the back contour region and the predetermined pressure value is within the preset range. If the difference between the pressure value of the pressure signal sent by each pressure sensor 221 and the predetermined pressure value is within the preset range, it indicates that the pressures applied by different positions of the back of the person sitting on the safety seat are substantially equivalent, the different positions are uniformly pressed on the covering part and the shape of the surface of the covering part 22 matches the shape of the surface of the back. At this time, the adjustment stopping signal can be sent to the driving structure. If the difference between the pressure value of the pressure signal sent by at least one pressure sensor 221 within the back contour region and the predetermined pressure value is not within the preset range, it indicates that the pressure applied by at least one position of the back of the person sitting on the safety seat on the covering part is different from the pressures applied by other positions of the back of the person sitting on the safety seat on the covering part, i.e., not all the positions of the back of the person sitting on the safety seat are uniformly pressed on the covering part, and the shape of the surface of the covering part 22 does not match the shape of the surface of the back. In this case, the adjustment continuation signal needs to be sent to the driving structure till the difference between the pressure value of the pressure signal collected by each pressure sensor 221 within the back contour region on the covering part 22 and the predetermined pressure value is within the preset range and the shape of the surface of the covering part 22 matches the shape of the surface of the back.

Based on the above structure and the above principle, when the surface of the covering part 22 is provided with the pressure sensors, the data processing device can determine the shape of the back surface of the person sitting on the safety seat and send the covering part adjustment signal.

The data processing device including the first signal receiver, the first analyzer, the second analyzer and the third analyzer may be integrated on the seat back 20 or on the seat base 10, or may have a multi-component structure with some components provided on the seat back 20 and some other components provided on the seat base 10. Specifically, no matter whether the data processing device is completely provided on the seat back 20 or on the seat base 10, or a part of the data processing device is provided on the seat back 20 and a part of the data processing device is provided on the seat base 10, the arrangement of the data processing device shall not influence the sitting experience and the aesthetic property.

Figure 4:
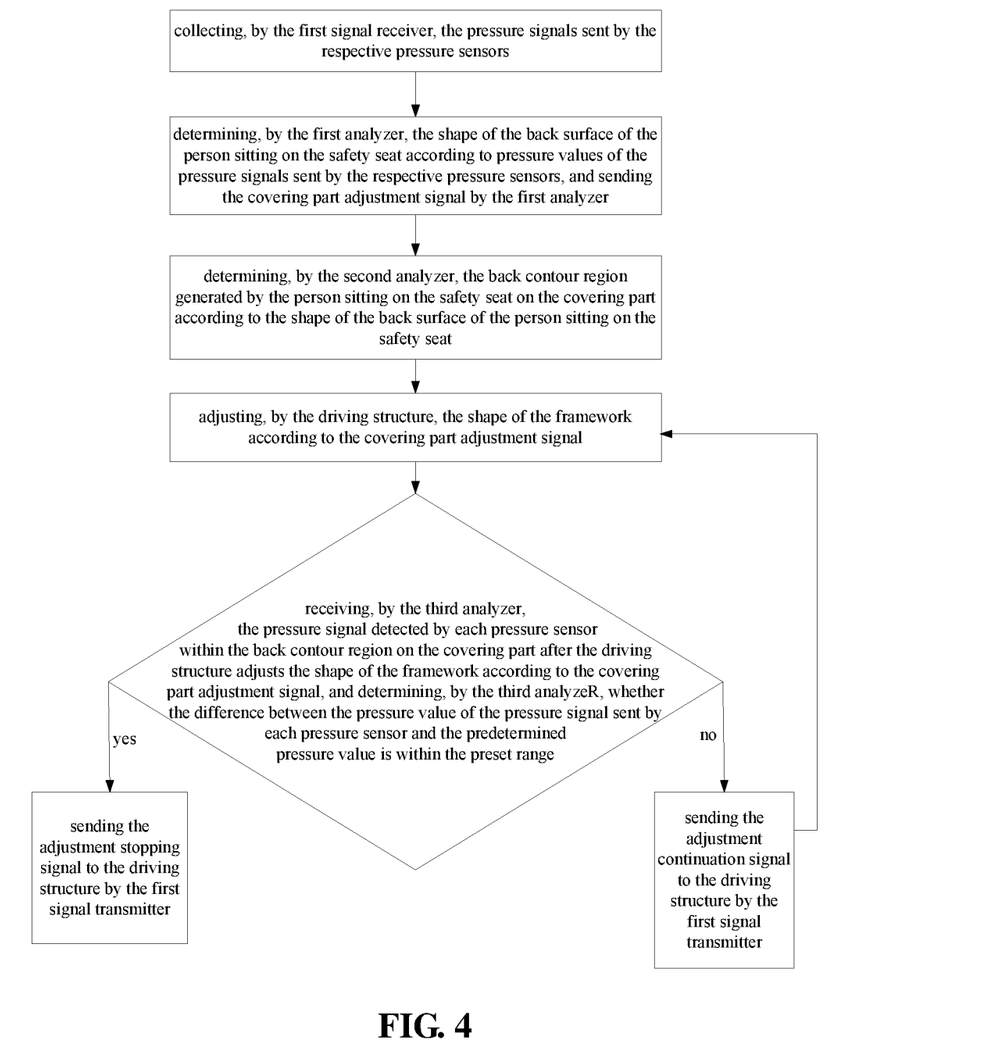
FIG. 4 is a flow chart of automatically adjusting a shape of a seat back of a safety seat provided with pressure sensors according to some embodiments of the present disclosure.

As shown in FIG. 4, when the seat back 20 of the safety seat according to the embodiments of the present disclosure is provided with the pressure sensors, a procedure of automatically adjusting the shape of the seat back according to the shape of the back surface of the person sitting on the safety seat include:

collecting, by the first signal receiver, the pressure signals sent by the respective pressure sensors 221;

determining, by the first analyzer, the shape of the back surface of the person sitting on the safety seat according to pressure values of the pressure signals sent by the respective pressure sensors 221, and sending the covering part adjustment signal by the first analyzer;

determining, by the second analyzer, the back contour region generated by the person sitting on the safety seat on the covering part 22 according to the shape of the back surface of the person sitting on the safety seat;

adjusting, by the driving structure, the shape of the framework 21 according to the covering part adjustment signal;

receiving, by the third analyzer, the pressure signal detected by each pressure sensor 221 within the back contour region on the covering part 22 after the driving structure adjusts the shape of the framework 21 according to the covering part adjustment signal, and determining, by the third analyzer, whether the difference between the pressure value of the pressure signal sent by each pressure sensor 221 and the predetermined pressure value is within the preset range; and sending the adjustment stopping signal to the driving structure by the first signal transmitter in the case that the third analyzer determines that the difference between the pressure value of the pressure signal send by each pressure sensor 221 within the back contour region on the covering part 22 and the predetermined pressure value is within the preset range, and sending the adjustment continuation signal to the driving structure by the first signal transmitter in the case that the third analyzer determines that the difference between the pressure value of the pressure signal sent by at least one pressure sensor 221 within the back contour region on the covering part 22 and the predetermined pressure value is not within the preset range.

Figure 5:
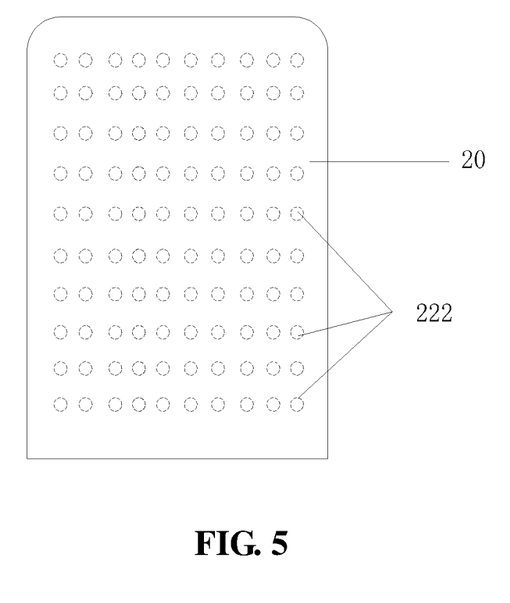
FIG. 5 is a schematic view showing a structure of position sensors of a seat back of a safety seat according to some embodiments of the present disclosure.

In the safety seat according to some embodiments, the sensors provided on the surface of the covering part 22 may be position sensors. A plane view of the covering part 22 is shown in FIG. 5. Multiple position sensors 222 are uniformly provided on the surface of the covering part 22, for sensing perpendicular distances from the back of the person sitting on the safety seat to the surface of the covering part 22 and obtaining distance signals corresponding to the perpendicular distances. That is, pieces of back position information obtained by the respective position sensors 222 include the distance signals corresponding to the perpendicular distances from the back of the person sitting on the safety seat to the surface of the covering part 22.

Specifically, the position sensors 222 may measure perpendicular distances from the back of the person sitting on the safety seat to respective mounting points of the position sensors 222 on the surface of the covering part 22 through sending electromagnetic wave or infrared wave. The data processing device determines the shape of the back surface of the person sitting on the safety seat according to the distance signals obtained by the respective position sensors 222 and sends the covering part adjustment signal.

Preferably, in conjunction with FIGS. 5 and 1, the data processing device specifically includes:

a second signal receiver used for collecting the distance signals obtained by the respective position sensors;

a fourth analyzer used for determining the shape of the back surface of the person sitting on the safety seat according to distance values of the distance signals obtained by the respective position sensors;

a fifth analyzer used for determining a back contour region generated by the person sitting on the safety seat on the covering part 22 according to the shape of the back surface of the person sitting on the safety seat;

a sixth analyzer used for receiving a distance signal detected by each position sensor 222 within the back contour region on the covering part 22 after the driving structure adjusts the shape of the framework 21 according to the covering part adjustment signal, and determining whether a difference between the distance value of the distance signal obtained by each position sensor 222 within the back contour region on the covering part 22 and a predetermined distance value is within a preset range; and a second signal transmitter used for sending an adjustment stopping signal to the driving structure in the case that the sixth analyzer determines that the difference between the distance value of the distance signal obtained by each position sensor 222 within the back contour region on the covering part 22 and the predetermined distance value is within the preset range, and sending an adjustment continuation signal to the driving structure in the case that the sixth analyzer determines that the difference between the distance value of the distance signal obtained by at least one position sensor 222 within the back contour region on the covering part 22 and the predetermined distance value is not within the preset range.

The data processing device in the embodiments of the present disclosure uses the fifth analyzer to determine the back contour region (i.e. an abutting range on the covering part 22) of the person sitting on the safety seat on the covering part 22. After the driving structure adjusts the shape of the framework 21 according to the covering part adjustment signal, the sixth analyzer is used to determine whether the difference between the distance value of the distance signal detected by each position sensor 222 within the back contour region and the predetermined distance value is within the preset range. If the difference between the distance value of the distance signal detected by each position sensor 222 and the predetermined distance value is within the preset range, e.g., the distance value of the distance signal obtained by each position sensor 222 is zero or the difference between the distance value of the distance signal obtained by each position sensor 222 and a predetermined distance value zero is within the preset range, it indicates that the distances between different positions of the back and the surface of the covering part 222 are equal, and the shape of the surface of the covering part 22 matches the shape of the surface of the back. At this time, the adjustment stopping signal can be sent to the driving structure. If the difference between the distance value of the distance signal obtained by at least one position sensor 222 within the back contour region on the covering part 22 and the predetermined distance value is not within the preset range, it indicates that the shape of the surface of the covering part 22 does not match the shape of the surface of the back. In this case, the adjustment continuation signal needs to be sent to the driving structure till the difference between the distance value of the distance signal obtained by each position sensor 222 within the back contour region on the covering part 22 and the predetermined distance value is within the preset range and the shape of the surface of the covering part 22 matches the shape of the surface of the back.

Based on the above structure and the above principle, when the surface of the covering part 22 is provided with the position sensors, the data processing device can determine the shape of the back surface of the person sitting on the safety seat and send the covering part adjustment signal.

Figure 6:
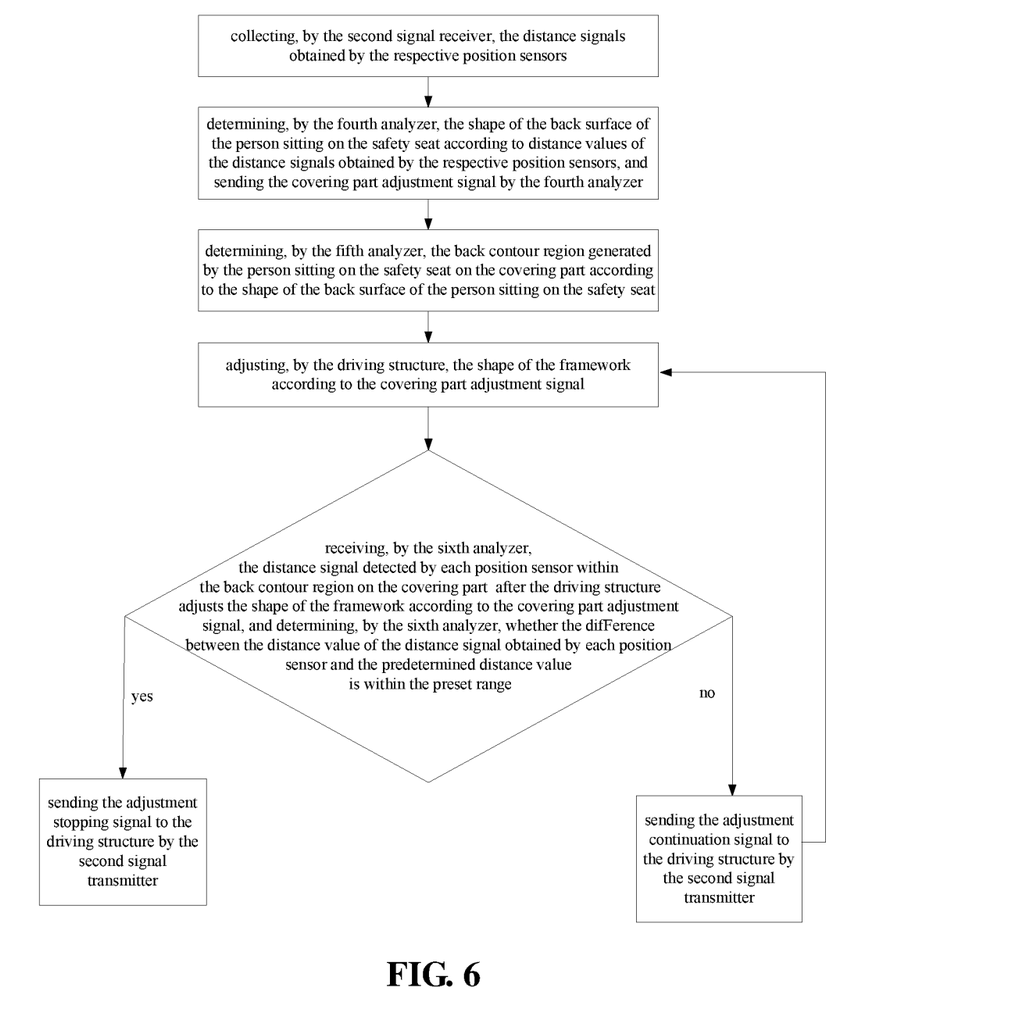
FIG. 6 is a flow chart of automatically adjusting a shape of a seat back of a safety seat provided with position sensors according to some embodiments of the present disclosure.

As shown in FIG. 6, when the seat back 20 of the safety seat according to the embodiments of the present disclosure is provided with the position sensors, a procedure of automatically adjusting the shape of the seat back according to the shape of the back surface of the person sitting on the safety seat include:

collecting, by the second signal receiver, the distance signals obtained by the respective position sensors;

determining, by the fourth analyzer, the shape of the back surface of the person sitting on the safety seat according to distance values of the distance signals obtained by the respective position sensors, and sending the covering part adjustment signal by the fourth analyzer;

determining, by the fifth analyzer, the back contour region generated by the person sitting on the safety seat on the covering part 22 according to the shape of the back surface of the person sitting on the safety seat;

adjusting, by the driving structure, the shape of the framework 21 according to the covering part adjustment signal;

receiving, by the sixth analyzer, the distance signal detected by each position sensor 222 within the back contour region on the covering part 22 after the driving structure adjusts the shape of the framework 21 according to the covering part adjustment signal, and determining, by the sixth analyzer, whether the difference between the distance value of the distance signal obtained by each position sensor 222 and the predetermined distance value is within the preset range; and sending the adjustment stopping signal to the driving structure by the second signal transmitter in the case that the sixth analyzer determines that the difference between the distance value of the distance signal obtained by each position sensor 222 within the back contour region on the covering part 22 and the predetermined distance value is within the preset range, and sending the adjustment continuation signal to the driving structure by the second signal transmitter in the case that the sixth analyzer determines that the difference between the distance value of the distance signal obtained by at least one position sensor 222 within the back contour region on the covering part 22 and the predetermined distance value is not within the preset range.

When the surface of the backrest 22 is provided thereon with the pressure sensors or the position sensors, a specific location where the data processing device is arranged is not limited herein.

Preferably, in a safety seat according to some embodiments of the present disclosure, as shown in FIG. 1, vents 11 are provided in the seat base 10 and extend to a surface of the seat base 10. Furthermore, the seat base 10 is provided with an air-exhausting device (not shown in the FIG. 1) connected to the vents 11. The air-exhausting device can be provided outside or inside the seat base 10 or can be provided at a lower part of the seat base 10.

In another aspect of the present disclosure, as shown in FIG. 1, the surface of the seat base 10 is provided with temperature sensors 12 for monitoring a surface temperature of the seat base 10.

Figure 7:
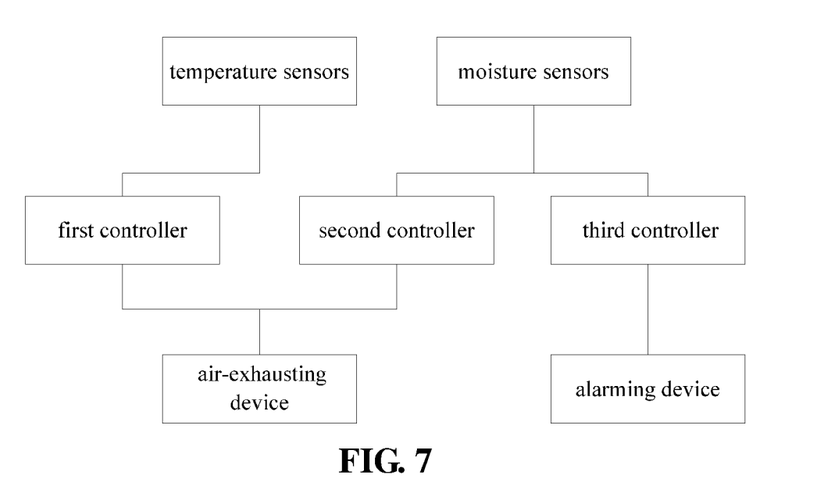
FIG. 7 is a schematic view showing a circuit connection structure of an air-exhausting device provided in a safety seat according to some embodiments of the present disclosure.

In combination with FIGS. 7 and 1, the safety seat according to some embodiments of the present disclosure further includes a first controller for initiating the air-exhausting device in the case that the temperature sensors 12 detect that the surface temperature of the seat base 10 is higher than a preset temperature.

The safety seat having the above structure makes use of the dispositions of the temperature sensors, the air-exhausting device and the first controller. When the person sitting on the safety seat feels hot and the temperature of a part of the surface of the seat base 10 in contact with the person is higher than the preset temperature, the first controller can automatically initiate the air-exhausting device and the person sitting on the safety seat is cooled down with the help of the vents 11, thereby satisfying requirements on comfort of the person sitting on the safety seat.

Preferably, in a safety seat according to some embodiments of the present disclosure, the surface of the seat base 10 may be provided with moisture sensors 13 for monitoring a surface moisture of the seat base 10. The safety seat further includes a second controller for initiating the air-exhausting device in the case that the moisture sensors 13 detect that the surface moisture of the seat base 10 is greater than a first preset moisture.

The safety seat having the above structure makes use of the disposition of the moisture sensors 13. When the surface moisture of the seat base 10 is greater than the first preset moisture, it indicates that the person sitting on the safety seat riding on the safety seat is sweating. At this time, the second controller automatically initiates the air-exhausting device, and dehumidification is performed for the person sitting on the safety seat through the vents 11, thereby satisfying requirements on comfort of the person sitting on the safety seat.

Further, a safety seat according to some embodiments of the present disclosure may include an alarming device that alarms by emitting a light or making a sound, and a third controller for initiating the alarming device in the case that the moisture sensors detect that the surface moisture of the seat base is greater than a second preset moisture, where the second preset moisture is greater than the first preset moisture.

Through the disposition of the third controller, when the moisture sensors detect that the surface moisture of the seat base 10 is greater than the second preset moisture, e.g., when a baby sitting on the safety seat wets his pants, the alarming device alarms to warn his parents.

The first controller, the second controller and the third controller can be integrated into one controller structure, or can be provided as separate structures. Specifically, they can be provided inside the seat base 10 or provided at a lower part of the seat base 10.

Preferably, as show in FIG. 1, a safety seat according to some embodiments of the present disclosure further includes an information output system 30 used for sending data that is calculated by the data processing device for representing the shape of the back surface of the person sitting on the safety seat to a display terminal, so as to display a simulated back state of the person sitting on the safety seat with an image on the display terminal.

When the safety seat is mounted on a vehicle, the display terminal can be a vehicle-mounted display terminal on the vehicle. By means of a wireless or wired communication between the vehicle-mounted display terminal and the information output system 30, the data representing the shape of the back surface of the person sitting on the safety seat is transmitted to the vehicle-mounted display terminal. The simulated state is displayed with an image on the vehicle-mounted display terminal, so that the driver or other person on the vehicle may acquire the state of the person sitting on the safety seat at any time.

A safety seat according to some embodiments of the present disclosure may further include a weight detector for detecting a weight of the person sitting on the safety seat and a voice player for reporting the weight of the person sitting on the safety seat. By means of the weight detector and the voice player, when a child sits on the safety seat, his parents may acquire the weight of their child at regular intervals.

Further, the safety seat can be provided with an infrared scanning detector for scanning to detect a height of a person sitting on the safety seat.

Surely, a safety seat according to some embodiments of the present disclosure may further be provided with elements for fulfilling other auxiliary functions such as an electronic monitoring element used for monitoring heartbeats, or may have other structures provided in conventional safety seats, such as, a structure for adjusting an inclination angle of the seat back and a structure for adjusting the back seat forward and backward.

The safety seat of the embodiments of the present disclosure can detect, through the sensors provided on the surface of the covering part, to obtain the back position information of the person sitting on the safety seat, determine the back shape and automatically adjust the shape of the covering part to match the shape of the back of the person sitting on the safety seat. In addition, temperature and sweating state of the person sitting on the safety seat can be monitored by means of the moisture sensors and the temperature sensors on the surface of the seat base, and the vents in the seat base helps in ventilation and heat dissipation, thereby meeting the requirements on comfort of the person sitting on the safety seat.

The above are merely preferred embodiments of the present disclosure. It should be noted that, a person skilled in the art may make further modifications and polishment to the present disclosure without departing from the principle of the present disclosure, and these modifications and improvements shall fall in the scope of the present disclosure.

What is claimed is:

1. A safety seat, comprising a seat base and a seat back, wherein the seat back comprises a framework adjustable in shape and a covering part that covers an exterior of the framework and is made of a flexible material, and a surface of the covering part is provided with a plurality of sensors configured to sense and obtain back position information of a person sitting on the safety seat;
    wherein the safety seat further comprises:
    a data processing device configured to receive the back position information obtained by each of the plurality of sensors, determine a shape of a back surface of the person sitting on the safety seat, and send a covering part adjustment signal; and
    a driving structure configured to adjust a shape of the framework according to the covering part adjustment signal and change a shape of the surface of the covering part by changing the shape of the framework, wherein the changed shape of the surface of the covering part matches the shape of the back surface of the person sitting on the safety seat.

2. The safety seat according to claim 1, wherein the framework comprises a plurality of support rods connected to each other, and adjacent support rods among the plurality of support rods are connected rotatably;

wherein the driving structure adjusts angles formed by the adjacent support rods according to the covering part adjustment signal to adjust the shape of the framework.

3. The safety seat according to claim 2, wherein the driving structure comprises a driving motor and a plurality of connection rods,
each of the plurality of connection rods is connected to the driving motor, and the plurality of support rods is connected to the plurality of connection rods in a one-to-one correspondence, and
the driving motor drives a corresponding connection rod to move according to the covering part adjustment signal, such that a support rod corresponding to the moved connection rod moves and the angles formed by the adjacent support rods change.

4. The safety seat according to claim 2, wherein the plurality of support rods comprises support rods horizontally arranged in a plurality of rows and support rods vertically arranged in a plurality of columns, there is more than one support rod horizontally arranged in each row and there is more than one support rod vertically arranged in each column, the support rods that are horizontally arranged and the support rods that are vertically arranged intersect each other to form a grid, and the adjacent support rods are rotatably connected.

5. The safety seat according to claim 2, wherein the driving structure comprises a plurality of driving motors and a plurality of connection rods, the plurality of connection rods is connected to the plurality of driving motors in a one-to-one correspondence, the plurality of connection rods is connected to connection points of adjacent support rods in a one-to-one correspondence, and positions of the connection points between adjacent support rods has a one-to-one correspondence with positions of respective sensors, and
the plurality of driving motors drives a corresponding connection rod to move according to the covering part adjustment signal, such that a support rod corresponding to the moved connection rod moves and the angles formed by the adjacent supports rods changes.

6. The safety seat according to claim 1, wherein the plurality of sensors is a plurality of pressure sensors configured to sense pressures applied on the covering part by a back of the person sitting on the safety seat and obtain pressure signals corresponding to the pressures;
wherein the data processing device comprises:
a first signal receiver, configured to collect the pressure signals obtained by the plurality of pressure sensors, and
a first analyzer, configured to determine the shape of the back surface of the person sitting on the safety seat according to pressure values of the pressure signals obtained by the plurality of pressure sensors.

7. The safety seat according to claim 6, wherein the data processing device further comprises:
a second analyzer, configured to determine, according to the shape of the back surface of the person sitting on the safety seat that is determined by the first analyzer, a back contour region generated by the person sitting on the safety seat on the covering part;
a third analyzer, configured to receive a pressure signal detected by each pressure sensor within the back contour region on the covering part after the driving structure adjusts the shape of the framework according to the covering part adjustment signal, and determine whether a difference between the pressure value of the pressure signal sent by each pressure sensor within the back contour region on the covering part and a predetermined pressure value is within a preset range; and
a first signal transmitter, configured to send an adjustment stopping signal to the driving structure in the case that the third analyzer determines that the difference between the pressure value of the pressure signal sent by each pressure sensor within the back contour region on the covering part and the predetermined pressure value is within the preset range, and send an adjustment continuation signal to the driving structure in the case that the third analyzer determines that the difference between the pressure value of the pressure signal sent by at least one pressure sensor within the back contour region on the covering part and the predetermined pressure value is not within the preset range.

8. The safety seat according to claim 1, wherein the plurality of sensors is a plurality of position sensors configured to sense perpendicular distances from the back surface of the person sitting on the safety seat to the surface of the covering part and obtain distance signals corresponding to the perpendicular distances;
wherein the data processing device comprises:
a second signal receiver, configured to collect the distance signals obtained by the plurality of position sensors, and
a fourth analyzer, configured to determine the shape of the back surface of the person sitting on the safety seat according to distance values of the distance signals obtained by the plurality of position sensors.

9. The safety seat according to claim 8, wherein the data processing device comprises:
a fifth analyzer, configured to determine, according to the shape of the back surface of the person sitting on the safety seat, a back contour region generated by the person sitting on the safety seat on the covering part;
a sixth analyzer, configured to receive a distance signal detected by each position sensor within the back contour region on the covering part after the driving structure adjusts the shape of the framework according to the covering part adjustment signal, and determine whether a difference between the distance value of the distance signal obtained by each position sensor within the back contour region on the covering part and a predetermined distance value is within a preset range; and
a second signal transmitter, configured to send an adjustment stopping signal to the driving structure in the case that the sixth analyzer determines that the difference between the distance value of the distance signal obtained by each position sensor within the back contour region on the covering part and the predetermined distance value is within the preset range, and send an adjustment continuation signal to the driving structure in the case that the sixth analyzer determines that the difference between the distance value of the distance signal obtained by at least one position sensor within the back contour region on the covering part and the predetermined distance value is not within the preset range.

10. The safety seat according to claim 1, wherein vents are provided in the seat base, the vents extend to a surface of the seat base, and the seat base is further provided with an air-exhausting device connected to the vents.

11. The safety seat according to claim 10, wherein the surface of the seat base is provided with temperature sensors configured to monitor a surface temperature of the seat base, and the safety seat further comprises a first controller configured to initiate the air-exhausting device in the case that the temperature sensors detect that the surface temperature of the seat base is higher than a preset temperature.

12. The safety seat according to claim 10, wherein the surface of the seat base is provided with moisture sensors configured to monitor a surface moisture of the seat base, and the safety seat further comprises a second controller configured to initiate the air-exhausting device in the case that the moisture sensors detect that the surface moisture of the seat base is greater than a first preset moisture.

13. The safety seat according to claim 12, further comprising
- an alarming device configured to alarm by emitting a light or making a sound, and
- a third controller configured to initiate the alarming device in the case that the moisture sensors detect that the surface moisture of the seat base is greater than a second preset temperature, wherein the second preset moisture is greater than the first preset moisture.

14. The safety seat according to claim 1, further comprising
- an information output system, configured to send data that is calculated by the data processing device for representing the shape of the back surface of the person sitting on the safety seat to a display terminal, to display a simulated back state of the person sitting on the safety seat with an image on the display terminal.

15. The safety seat according to claim 1, wherein the seat base further is provided with a weight detector configured to detect a weight of the person sitting on the safety seat and a voice player configured to report the weight of the person sitting on the safety seat.

* * * * *